June 29, 1954
R. A. FISCH
2,682,081
METHOD OF PRODUCING A STRIATED EXTRUDED TUBING
Filed Feb. 28, 1951
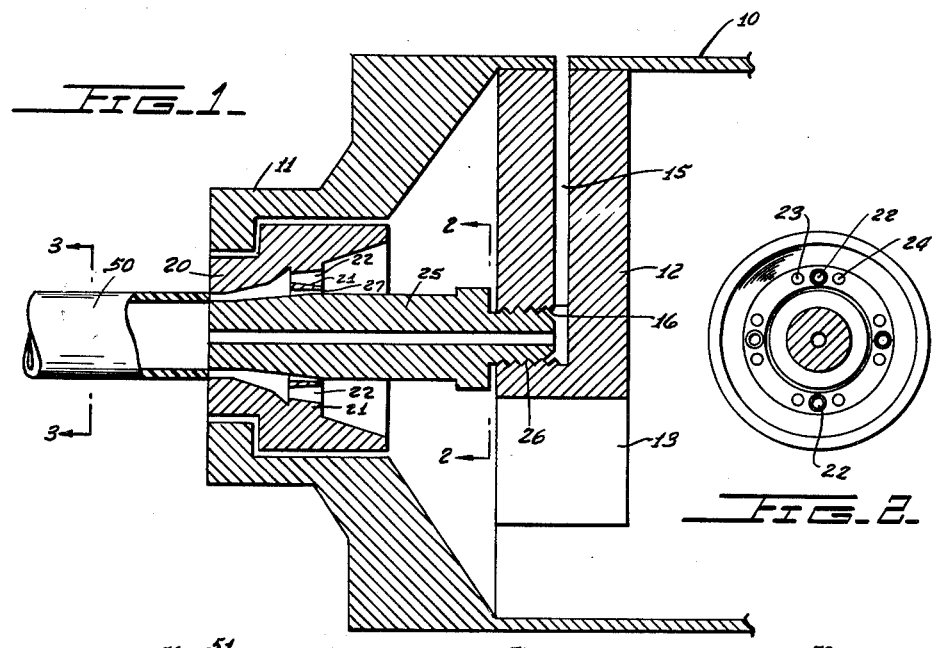
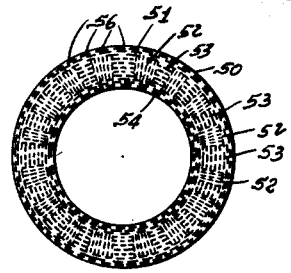
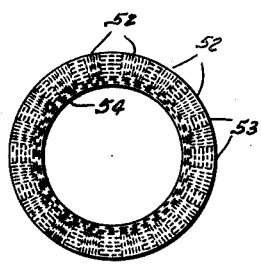
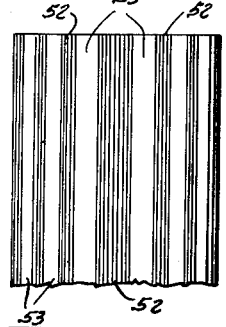
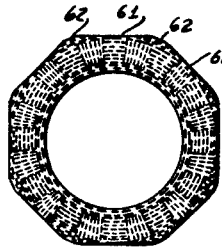
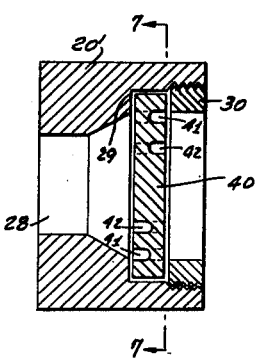
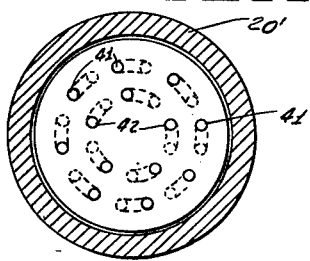
INVENTOR.
RICHARD A. FISCH
BY
*Green, Pineles & Durr*
ATTORNEYS Patented June 29, 1954

2,682,081

UNITED STATES PATENT OFFICE 2,682,081

METHOD OF PRODUCING A STRIATED EXTRUDED TUBING

Richard A. Fisch, New York, N. Y.

Application February 28, 1951, Serial No. 213,155

1 Claim. (Cl. 18—47.5)

This invention relates to a novel process of producing a linear extruded product with a decorative striated effect.

An object of the invention is to produce an extruded rod or tube of plastic material with a striated effect.

Another object of the invention is to produce an extruded linear product containing embedded flake material which tube has a striated effect at the surface thereof due to a predetermined alignment of said flakes in different parts of said product.

These objects and others ancillary thereto are attained by adding opaque or light reflective flake particles to a plastic molding composition extruding the composition through an extrusion device containing a means for differentially aligning the flake just back of the extrusion die. While it may appear to be obvious that such a process would produce a striated effect in the product, it was actually found that the product had no visible striations. This invention is based on the discovery that the plain, ordinary appearance of the product was due to the fact that the flake at the surface areas had again been realigned parallel to the surface by the frictional contact with the extrusion die. To obtain an extruded product with a striated appearance either one of two processes must be followed. First, a very few of the particles or pigments and dyes can be added so that the composition is not completely opaque but is rather translucent whereby the striated area immediately beneath the unstriated surface area is visible. Second, the ordinary opaque compositions may be employed and the surface areas of the extruded product can then be removed as by grinding to reveal the striated parts.

Various linear designs may be imparted to the extruded product by changing the structure of the means for differentially aligning the flake. A very satisfactory means for upsetting the regular alignment (which is the natural result of the ordinary extrusion process) is an obstacle ring or plate containing holes which are out of alignment or eccentric with respect to the extrusion orifice. The various holes may be of different sizes and can be round, elliptical or angular in cross sectional shape. A greater degree of alignment is obtained by making the holes smaller at the outlet side than at the side where the composition enters the holes in the plate. Obviously, the holes of the obstacle ring or plate must be long enough to cause a substantial realignment of the particles in accordance with, i. e., parallel to the surfaces of the said holes.

Any transparent or translucent thermoplastic material may be employed as the base material. Polymers of methyl methacrylates, styrene, cellulose acetate, cellulose acetate butyrate, are illustrative of desirable thermoplastic materials. The material is plasticized with high boiling or solid plasticizers and contains no substantial amount of volatile solvent. In other words, a plastic or melt extrusion process is employed.

As the light reflecting particles, the metal flakes such as nickel, aluminum, silver, gold, bronze, copper, tin and brass flakes and natural substances such as mica and fish scale essence, etc. may be employed. From ¼ to 10% or more of the flake may be added although there is no apparent advantage obtained by adding much over that amount required to produce an opaque product (about 5%, for example).

The novel features characteristic of the invention are set forth with particularity in the appended claim. The invention itself, however, both as to its organization and its method of operation, together with additional objects and advantages thereof, will best be understood from the following description of specific embodiments when read in connection with the accompanying drawing in which:

Figure 1 is a cross sectional view of an extrusion device employed to extrude the composition containing light reflecting particles.

Figure 2 is a cross sectional view taken on line 2—2 of Figure 1.

Figure 3 is a cross sectional view of an extruded tube made according to the invention illustrating diagrammatically how the light reflecting flakes may be aligned therein.

Figure 4 is a view similar to Figure 3 but with the outside surface of the tube removed.

Figure 5 is a partial longitudinal view of the tube of Fig. 4.

Figure 6 is a detail view showing a modified form of die and obstacle plate.

Figure 7 is a view taken on line 7—7 of Figure 6.

Figure 8 is a view similar to Fig. 4 showing another way of bringing out the decorative effect.

The first step in the process involves merely mixing of the proper ingredients to form the composition. Such compositions containing light reflecting, flaky particles are well known in the art and as ordinarily extruded they produce an article in which the particles are preferentially aligned parallel to the direction of extrusion and parallel to the surface of the extruded article. Since the flakes or particles added are essentially flat or two-dimensional there are two directions at right angles to each other in which the particles can be aligned. For example, in the product of the present invention one dimension of the particles is still preferentially aligned in the direction of extrusion but the second dimensions of all of the particles are not uniformly or preferentially aligned in one given direction, parallel to the surface, for example, as is usual in extruded products. Instead the particles in one narrow linear area of the inside of the product have the second dimension preferentially aligned parallel to the surface and the particles in an adjacent area have their second dimension preferentially aligned perpendicular to the surface. This effect is produced by an extrusion device similar to that shown in Figures 1 and 2. The plastic material is forced through the extrusion cylinder 10 in any desired way as by an extrusion screw or a plunger. The die 20 is fixed in the head 11 of the extrusion device. The die 20 is constructed in the ordinary way except that it contains a ring or obstacle plate 21 containing a number of sets of holes (four shown), 22, 23, 24. The chamber 10 contains a Y type of supporting plate having legs 12 and 13 (only two shown) which are adapted to hold the core forming member 25. Leg 12 contains the orifice 15 and the threaded openings 16 adapted to receive the threaded end 26 of the core forming member 25 to admit air to the center of the tube 50 which is formed by the extrusion process. The core member 25 is shown as allowing a narrow passage 27 between the surface thereof and the barrier plate 21 although the space can be entirely closed off if desired or additional particle realigning means may be formed between these two parts.

Figure 3 is a somewhat idealized and exaggerated cross sectional view of the product as formed by the device of Figure 1. It will be noted that in the surface area 51 the particles 56 are aligned:

(1) Parallel to the direction of extrusion and
(2) Parallel to the surface so that the product as shown in Figure 3 appears just like any normally extruded product of the same composition. However, the center area has a plurality of alternate zones 53 in which the particles are aligned parallel to the surface and a plurality of alternate zones 52 in which the particles are aligned perpendicular to the surface; when the outside portion 51 is removed, the product with the striated effect shown in Figures 4 and 5 is obtained. The interior surface portion 54 lacks the striations also but since this part does not show anyway it need not be removed. An unusual effect can be produced by removing only selected or alternate parts of the surface regions 51. In Figure 8, for example, the tube 60 has been ground to an octagonal configuration and the corner portions 62 have the normal alignment of crystals or flakes whereas the center parts 61 of the flat areas have a striated appearance.

As stated above the openings 21 in the barrier plate 22 may take various forms and shapes and one such modification is shown in Figs. 6 and 7. Here the barrier or obstacle plate 40 is separate from the die 20″. The die 20 has an opening 28 for extruding rod material which can be extruded in the same manner as tubing. A seat or shoulder 29 is also provided for holding the plate 40 and a ring 30 is provided to hold the plate 40 in place. The ring 30 can be only loosely pressed against the plate 40 so that slight rotation of the said plate is permitted or the ring 30 may be tightened so as to hold the plate 40 against any rotation. The plate 40 contains a plurality of openings 41, 42 arranged in two concentric rings and the rings are not parallel to the direction of extrusion but have a tangential component tending to rotate the plate 40 and/or the composition which is forced through the plate to produce variations in the striations. The surface of the die orifice 28 will of course align the outside layers corresponding to layers 51 of the extruded rods so that this layer will have to be removed to show the striated effect unless a very small proportion of flake is employed.

The following examples are given to illustrate the present invention:

*Example 1*

A plasticized cellulose acetate containing about 25 parts by weight of a plasticizer such as dimethoxyethyl phthalate is kneaded in a masticator with about 5% of aluminum flake. The plastic mass, so formed, is broken up and fed to an extrusion machine having a die and barrier plate such as illustrated in Figure 1 and extruded under heat and pressure. The extruded tubular product has a substantially uniform gray appearance of a tube extruded through an ordinary die. When the tube is subjected to a centerless grinding operation, however, to remove about .020″ of the surface area the resultant product has striations of alternate light and dark lines.

*Example 2*

Powdered cellulose acetate butyrate containing 25% of plasticizer is ground in a ball mill with ½% of red dye and 3% of aluminum flake. Thereafter the mix is fed to a screw stuffer type of extruding device with a die similar to that shown in Figure 1. The product of the extrusion has no unusual appearance until the surface layer thereof is removed to make the striations visible.

Where small amounts of flake (¼ to ¾%) are added to a compound containing no opaque dye the outside surface need not be removed to obtain the effect although the contrast is emphasized by the removal of the outside surface.

*Example 3*

Powdered cellulose acetate butyrate containing 25% of plasticizer is ground in a ball mill with ½% of fine mica powder and .05% of a dye which is adapted to produce a transparent material when the mica is not present Thereafter, the mixture is extruded as in Example 2.

The product of the extrusion shows the striations through to the surface, and removal of a surface layer is not necessary.

The process of the invention provides a novel way of obtaining a striated linear product by direct extrusion. The ordinary extrusion apparatuses can be modified to produce the product of the invention. Many different designs may be produced by changing the nature of the barrier plate as explained above.

I claim:

A process of producing extruded linear products containing flat decorative particles embedded therein with the flat surfaces of said particles arranged in a plurality of predetermined linear zones of similar orientations separated from each other by linear zones in which the particles have different orientations and which particles are visible from the surface of the product to provide a striated effect comprising the steps of extruding a normally solid, plastic composition containing ¼ to 10% of flat, flaky particles through an extrusion die, upsetting the normal alignment of said particles caused by the frictional forces and pressure of said extrusion process in at least one region adjacent to that surface of the die nozzle that forms the outside surface of the extruded object and removing at least a portion of the surface area of said extruded product to reveal the striations produced by the different alignment of the said particles.

References Cited in the file of this patent

UNITED STATES PATENTS

| Number | Name | Date |
|---|---|---|
| 1,700,208 | Paisseau | Jan. 29, 1929 |
| 2,233,987 | Orsini | Mar. 4, 1944 |
| 2,371,349 | Norton | Mar. 13, 1945 |

FOREIGN PATENTS

| Number | Country | Date |
|---|---|---|
| 261,772 | Great Britain | Oct. 27, 1927 |